United States Patent
Ciancio et al.

[11] Patent Number: 6,063,475
[45] Date of Patent: May 16, 2000

[54] COMPOSITE FORMABLE EDGE BANDING T-MOLDING

[76] Inventors: Salvatore Robert Ciancio, 148 Carlyle Crescent, Aurora, Ontario, Canada, L4G 6P8; Giovanni Battista Mondino, 179 Treegrove Circle, Aurora, Ontario, Canada, L4G 6M1; Jason Corbee Dutchburn, 107 Kelso Avenue, Toronto, Ontario, Canada, M5M 4C6

[21] Appl. No.: 09/166,747

[22] Filed: Oct. 5, 1998

[51] Int. Cl.[7] .................................................... B32B 3/06
[52] U.S. Cl. ........................... 428/100; 428/99; 428/119; 428/120; 428/212; 428/217; 248/345.1
[58] Field of Search .............................. 428/99, 100, 120, 428/192, 212, 217, 119; 248/345.1

[56] References Cited

U.S. PATENT DOCUMENTS

| | | | |
|---|---|---|---|
| 4,370,373 | 1/1983 | Janicz | 248/345.1 |
| 4,810,550 | 3/1989 | Gasser | 248/345.1 |

*Primary Examiner*—Alexander Thomas
*Attorney, Agent, or Firm*—David W. Wong

[57] ABSTRACT

The composite edge banding T-molding is an elongated continuous molding with a T-shaped cross section and having a relatively rigid core body situated between a flexible cover layer and a barbed mounting strip. The core body, the cover layer and the barbed mounting strip are made of compatible thermal plastic materials and are integrally and simultaneously formed by extrusion. The T-molding is bendable to retain selected curved or bent shape along its length.

4 Claims, 3 Drawing Sheets

COMPOSITE FORMABLE EDGE BANDING T-MOLDING

BACKGROUND OF THE INVENTION

Large panels are used in the fabrication of furniture such as the making of a work top for a table or desk. The panels are usually made of wood fibres compressed and impregnated in a binding mixture and covered on its top surface with a durable plastic laminate to provide a hard finish. The edge of such panels is necessarily and commonly provided with a relatively malleable edge covering in order to provide an aesthetic finish as well as a protective bumper for preventing damages to the edge by accidental impact with other furniture or hard objects. The edge covering is either a flat strip edge banding or an edge banding T-molding. The flat strip edge banding is an elongated flat strip of flexible plastic made of polyvinyl chloride, commonly known as PVC. The edge banding strip is supplied in a coiled condition for the fabrication of the work top, and it is uncoiled and attached to the edge of the work top with either an adhesive applied to the edge banding strip at the time of affixing it to the edge of the work top, or the adhesive pre-applied on the flat strip edge banding and/or on the edge of the work top. Such flat strip edge banding is awkward, messy and time consuming to affix onto the edge of the work top, since it must be mechanically maintained in an intimate contact with the latter while the adhesive is setting, otherwise the elasticity of the originally coiled edge banding would cause it to disengage from the edge of the work top. Such problem occurs even more readily if the edge of the work top has a sharp curvature or bend. Thus, when the edge banding is bent to conform with such sharp curvature of the edge of the table top, the inherent reactive bending force in the originally coiled edge banding would tend to return it to its original condition; and such reactive force would tend to force the edge banding to disengage with the edge of the work top if banding is not additionally and mechanically maintained mounted in place while the adhesive is setting. Furthermore, the banding could separate from the edge when the adhesive naturally deteriorates over time. The separation is also accelerated by the vapour and chemical gas emitted from the compressed fibre material in the work top panel as well as from the PVC material of the edge banding. The vapour and gas emissions augment the reactive elastic force of the edge banding to cause it to separate from the edge of the work top.

The above drawbacks have been alleviated by edge banding T-molding which is a flexible PVC edge banding having a barbed mounting strip provided on its rear face over its entire length thereof such that it has a T-shaped cross section. It is mounted to the edge of the table top by first pre-forming a mounting groove in the edge of the table top; and the T-molding is mounted to the edge of the table top by merely engaging its barbed mounting strip snugly with the mounting groove. Such edge banding T-molding normally has a rounded front face to provide the aesthetic and bumper functions required to prevent the table edge from being damaged when it is accidentally struck by another object. However, when the barbed mounting strip is inserted into the mounting groove, it inherently exerts either a pulling or pushing force on the molding depending on whether they are tightly or loosely fitted together; and due to the flexibility of the PVC material, the pulling or pushing force causes an unsightly deformation ridge or deformation groove or a series of sink marks or dents or discoloration to form on the front face of the edge banding T-molding directly opposite to the mounting strip. The formation of the deformation ridge or sink marks or dents or discoloration is particularly severe for a table top having an undulate and/or sharp edge curvature so that the mounting force between the mounting strip of the edge banding T-molding and the groove in the edge of the table top is often uneven throughout the length of the edge banding T-molding.

SUMMARY OF THE INVENTION

It is a principal object of the present invention to provide a composite edge banding T-molding which can be mounted on the edge of a table top without the formation of undesirable deformation ridge or groove or sink marks or discoloration.

It is another object of the present invention to provide a composite edge banding T-molding which is formable to conform with and shape and to secure permanently to an edge having an undulate and/or sharp edge curvature.

It is another object of the present invention to provide a composite edge banding T-molding which lends itself to the continuous extrusion fabrication process.

It is yet another object of the present invention to provide a composite edge banding T-molding which is simple in structure and may be installed on a table edge with ease.

Briefly, the composite edge banding T-molding has an elongated core body made of a relatively rigid thermoplastic material. A cover layer made of a flexible thermoplastic material is disposed on the front face of the core body. A mounting strip extends substantially perpendicular to the rear face of the core body. The composite edge banding T-molding is produced by extruding the three components, made of compatible thermoplastic materials, simultaneously to form an integral construction.

DETAILED DESCRIPTION OF THE PREFERRED EMBODIMENTS

Figure 1:
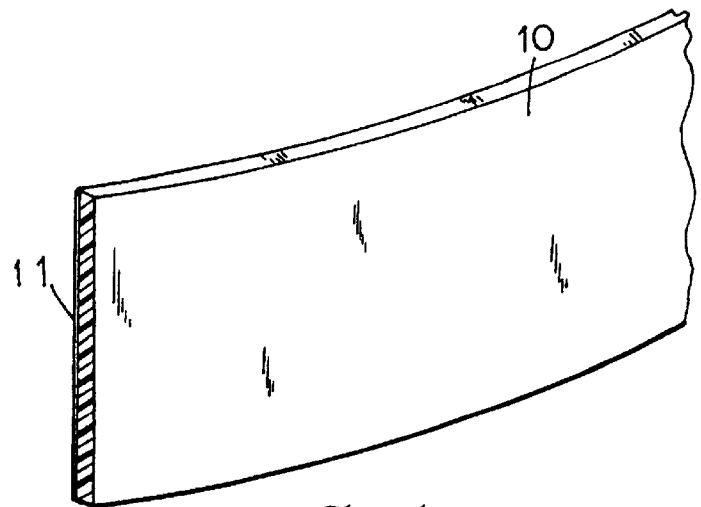
FIG. 1 is an isolated perspective elevation view of a conventional flat strip edge banding commonly used for covering the edge of a table top.
Figure 2:
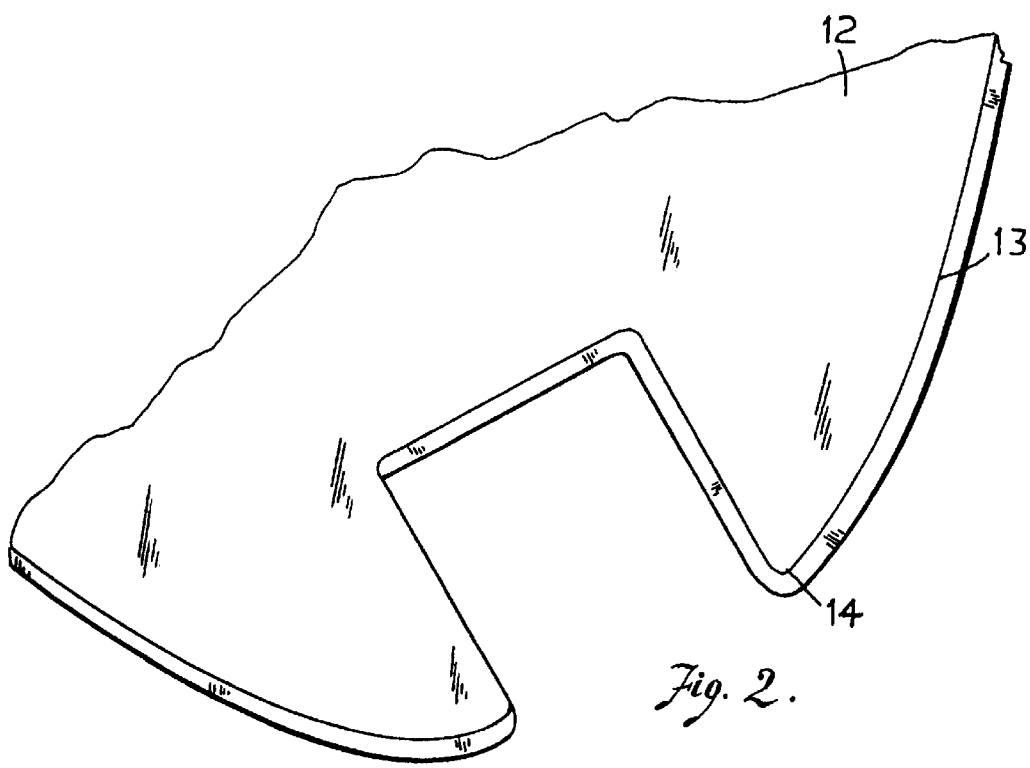
FIG. 2 is a perspective top elevation view of a table top of a contemporary furniture having large and sharp edge curvatures and a recessed portion therein.

Other objects and advantages of the present invention will become apparent from the following detailed description of the preferred embodiments. With reference to the drawings in which like reference numerals designate corresponding parts in the various views, a conventional edge banding 10 is shown in FIG. 1 in which the edge banding 10 is a flat strip made of PVC material. An adhesive 11 is provided on its rear face for mounting it to the edge of a table top 12 such as that shown in FIG. 2. Such table top 12 in a contemporary furniture may have an edge portion with a large curvature 13 and sharp edge portions 14. Such edge banding is particularly difficult to apply due to the large and sharp curvatures of the edge in the table top 12.

Figure 3:
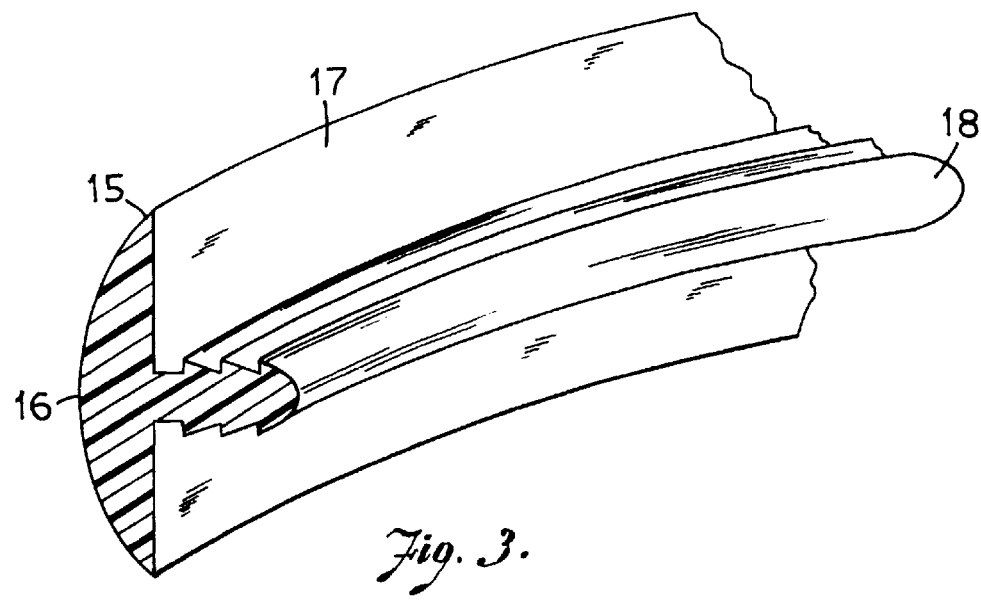
FIG. 3 is an isolated perspective rear elevation view of a conventional edge banding T-molding.
Figure 4:
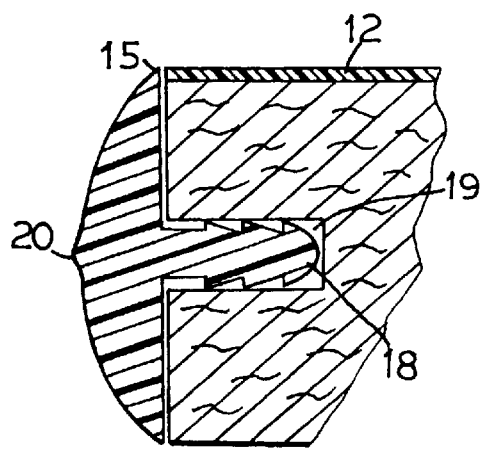
FIG. 4 is an isolated side sectional view of a conventional edge banding T-molding mounted on the edge of a table top and having an undesirable deformation ridge formed on its front face.
Figure 5:
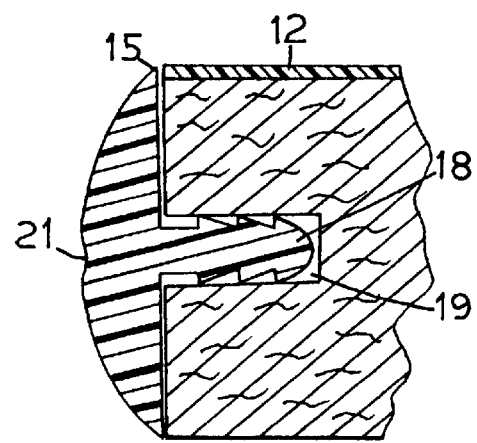
FIG. 5 is an isolated side sectional view of a conventional edge banding T-molding mounted on the edge of a table top and having an undesirable deformation groove or sink mark formed on its front face.

FIGS. 3, 4 and 5 show a conventional edge banding T-molding 15 made of flexible polyvinyl chloride (PVC) material which has a rounded front face 16 and a flat rear face 17 having a barbed mounting strip 18 formed at the center therein in a perpendicular manner such that the edge banding T-molding 15 has a T-shaped cross section. Such edge banding T-molding 15 is mounted to the edge of a table top 12 with a groove 19 pre-formed in the edge of the table top. Due to the flexibility of its material, when such edge banding T-molding is mounted to the pre-formed groove in the edge of the table top, an undesirable deformation ridge 20, or groove or sink marks 21 with discoloration is inherently formed on its front face 16 since the mounting strip engages unevenly with the mounting groove in the edge of the table top.

Figure 6:
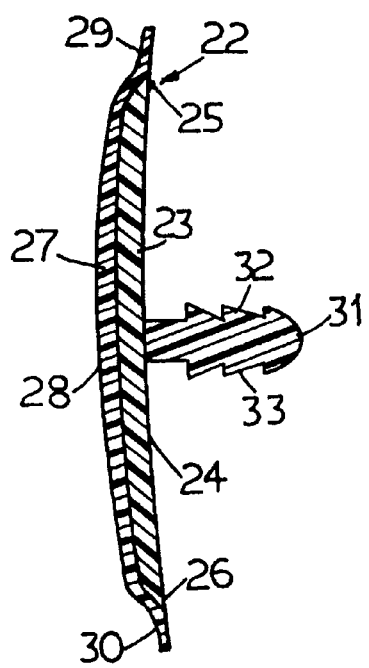
FIG. 6 is a side cross sectional view of the edge banding T-molding according to the present invention.
Figure 7:
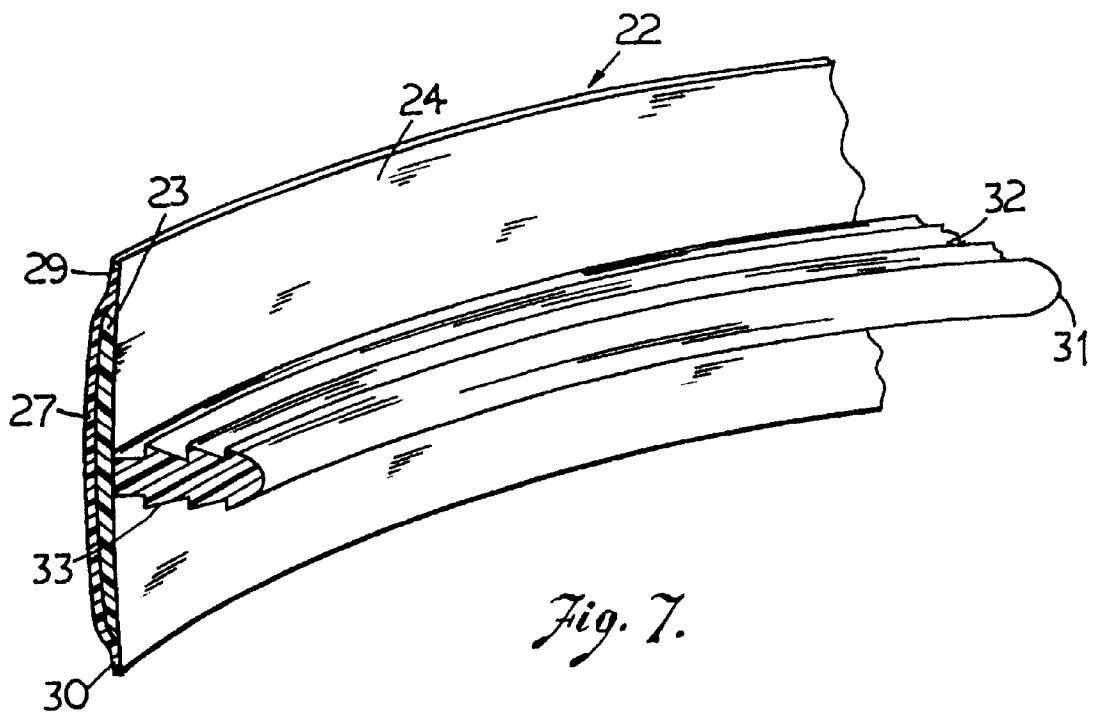
FIG. 7 is a perspective side elevation view of the edge banding T-molding according to the present invention.

The edge banding T-molding 22 of the present invention has a substantially T-shaped cross section as best shown in FIGS. 6 and 7. It has a core body 23 made in a continuous extrusion process with a relatively rigid thermoplastic material such as rigid PVC. The core body 23 has a slightly bowed shaped rear face 24 which slants rearwardly towards its outer edges 25 and 26. A cover layer 27 is provided over the front face of the core body. The cover layer 27 may be made of a flexible thermoplastic material such as flexible PVC which is compatible with the rigid PVC material of the core body 23 and may be extruded simultaneously therewith to form an integral construction. The cover layer 27 provides not only a protective cover for the core body 23 but also a resilient layer thereon to withstand any impact on the front face. The cover layer 27 may have a substantially flat or rounded front face 28. A substantially flat front face 28 is shown as an example in FIGS. 6 and 7. The front face 28 has a short upper edge extension portion 29 extending beyond the upper edge 25 of the core body 23, and a similar short lower edge extension portion 30 extending beyond the lower edge 26 of the core body 23.

A mounting strip 31 may be formed at the center of the rear face 24 of the core body 23 and extending outwardly therefrom in a perpendicular manner throughout the entire length of the core body 23 such that the edge banding T-molding 22 has a substantially T-shaped cross section. The mounting strip 31 may be formed off center to serve the same purpose. The mounting strip 31 has a barbed upper surface 32 and a corresponding barbed lower surface 33, and it may be made of the same flexible PVC material as the cover layer 27 which is different but compatible with the rigid PVC of the core body 23. The entire combination of the core body 22, the cover layer 27 and the barbed mounting strip 31 may be formed integrally in an extrusion process by simultaneously extruding the compatible materials through a die to form the continuous composite edge banding T-molding of the present invention.

The edge banding T-molding 22 may be mounted to the edge of a table top 12 which has a mounting groove pre-formed in its entire edge in a conventional manner. The mounting groove is commonly slightly narrower in width than the thickness of the mounting strip 31 such that the edge banding T molding 22 may be mounted to the edge of the table top 12 by snugly engaging with the pre-formed mounting groove. The relatively formable core body 23 of the edge banding T-molding 22 enables it to be bent or formed to conform with the curvature of the edge of the table top 12 and retaining such shape permanently so that there is relatively no inherent reactive force in the edge banding T-molding to return it to its original coiled condition. The slightly bowed shaped rear face 24 of the edge banding T-molding 22 facilitates it to embrace intimately the edge of the table top 12 and to compensate for any imperfection which may exist in the surface of the edge; and any excess portion of the upper edge extension portion 29 and/or the lower edge extension portion 30 extending beyond the upper surface and lower surface of the edge of the table top 12 may then be trimmed off so that they are closely level with these edges. Due to the permanent formation of the curvature of the edge banding T-molding 22 to conform with the curvature of the edge of the table top 12, there is no intrinsic reactive elastic force to restore it to its original coiled condition. Accordingly, the composite edge banding T-molding of the present invention may be mounted expeditiously and easily by tapping it into place along the entire edge of the table top during fabrication whereby the edge banding T-molding would conform with the curvature of the table top 12 intimately, and it is thus mounted securely thereto. Furthermore, the mounting of the edge banding T-molding is not affected by the gas and vapour emission from the fibre compound within the table top panel, as there is no inherent reactive force to separate it from the edge of the table top; and furthermore, the rigid core body 24 is not affected by any uneven engagement of the mounting strip 31 with the pre-formed mounting groove in the edge of the table top since the core body 23 is made of a rigid material, thus no undesirable deformation ridge and/or deformation groove and/or sink marks or discoloration would be formed in the front cover 27 of the edge banding T-molding.

While the present invention has been shown and described in the preferred embodiments thereof, it will be apparent that various modifications can be made therein without departing from the spirit of essential attributes thereof, and it is desired therefore that only such limitations be placed thereon as are imposed by the appended claims.

What we claim is:

1. A composite edge banding T-molding adaptable for mounting to an edge of a work top having an undulate curvature, comprising:

an elongated core body made of a relatively rigid polyvinyl chloride material, said core body being bendable to retain a selected shape conforming with said undulate curvature of said edge of said work top, and said core body having a front face and a rear face, a first longitudinal side edge and a second longitudinal side edge, a relatively thin cover layer made of a flexible polyvinyl chloride material disposed over the entirety of said front face of said core body, and said cover layer having a first extension edge portion extending outwardly beyond said first longitudinal side edge and a second extension edge portion extending outwardly beyond said second longitudinal side edge, a mounting strip made of said flexible polyvinyl chloride material same as said cover layer and extending substantially perpendicular to said rear face.

2. A composite edge banding T-molding according to claim 1 wherein said mounting strip is located at the centre of said rear face and extending throughout the entire length of said core body whereby said banding has a substantially T-shaped cross section.

3. A composite edge banding T-molding according to claim 2 wherein said mounting strip includes a barbed upper surface and a barbed lower surface.

4. A composite edge banding T-molding according to claim 3 wherein said core body, said cover layer and said mounting strip are integrally and simultaneously formed by extrusion.

* * * * *